United States Patent [19]
Cederberg et al.

[11] 3,825,681
[45] July 23, 1974

[54] DATA TERMINAL WITH DUAL THREE-STATION PRINTING

[75] Inventors: Howard R. Cederberg, Alamo; Charles W. Wiedeman, Castro Valley, both of Calif.

[73] Assignee: The Singer Company, New York, N.Y.

[22] Filed: Jan. 5, 1973

[21] Appl. No.: 321,176

[52] U.S. Cl............. 178/23 R, 178/27, 197/1, 197/2, 235/61.9 A
[51] Int. Cl............. H04l 21/00
[58] Field of Search .......... 197/1, 2, 3; 235/61.9 R, 235/61.9 A; 178/24, 25, 27, 23 R; 346/66, 67

[56] References Cited
UNITED STATES PATENTS
2,390,664  11/1945  Potts ............................. 178/27
3,157,115  11/1964  West et al. ..................... 178/23 R

*Primary Examiner*—Thomas A. Robinson
*Attorney, Agent, or Firm*—Edward L. Bell; Joseph R. Dwyer

[57] ABSTRACT

A data terminal having a dual printing system for printing data in one, or two adjacent stations concurrently, of a three-station data terminal.

6 Claims, 2 Drawing Figures

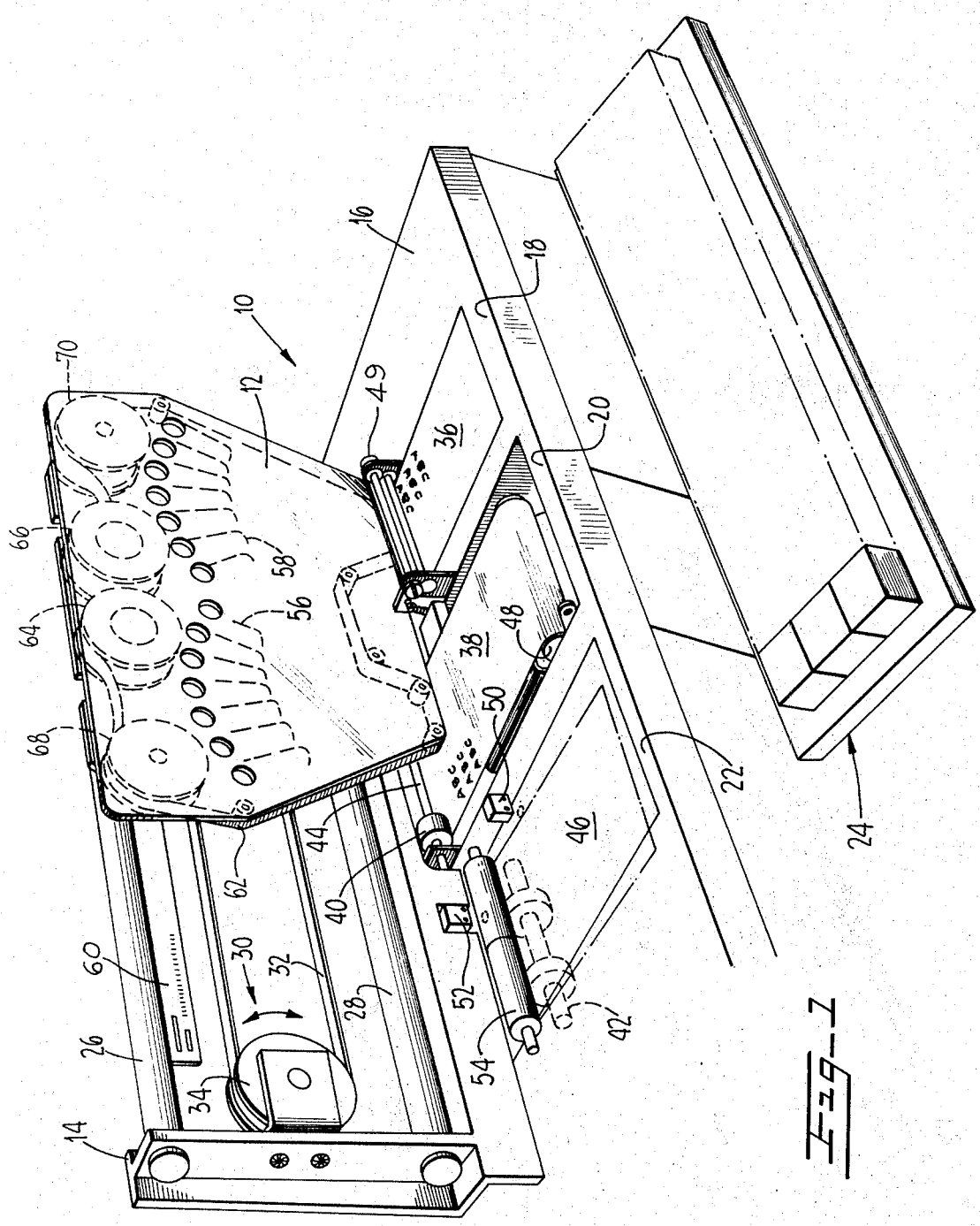

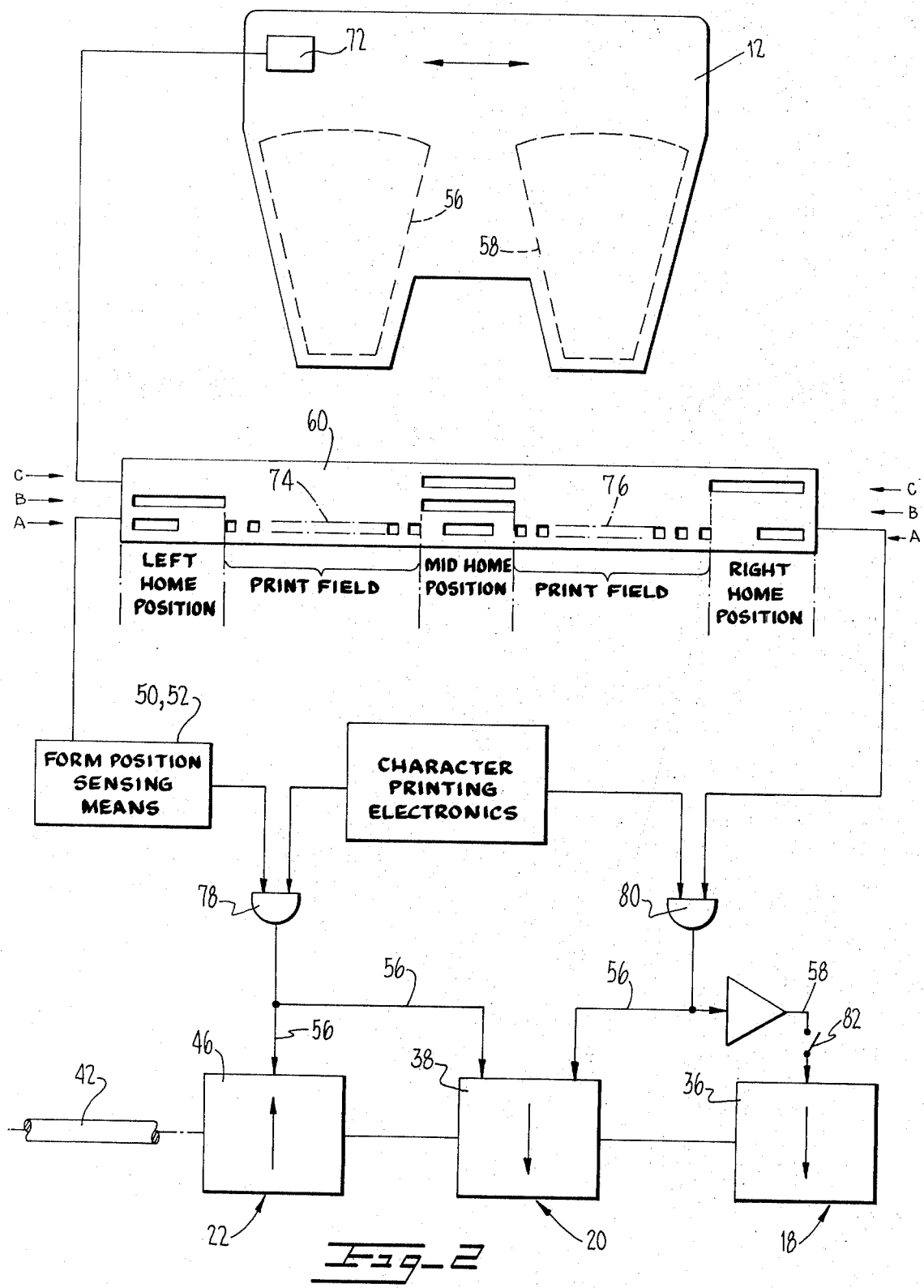

DATA TERMINAL WITH DUAL THREE-STATION PRINTING

CROSS-REFERENCES TO RELATED APPLICATIONS

U.S. application entitled "Character Strobing in a Data Terminal" of Hartley M. Naas, Julian C. Sutherland and Dale D. Nesbitt, filed Jan. 5, 1973, application Ser. No. 321,177;

U.S. application entitled "An Assembly for Spooling an Audit Trail in a Data Terminal" of James G. Savage and Arnold L. Hawkins, filed Jan. 5, 1973, application Ser. No. 321,197.

BACKGROUND OF THE INVENTION

1. Field of Invention

This invention relates, in general, to data terminals, and in particular, to a point-of-sale type data terminal in which a receipt, a permanent record on an audit trail, and a bill of sale or sales order form print-out is provided.

2. Description of the Prior Art

Conventional data terminals, either conventional mechanical cash registers or the so-called electronic cash registers, had provisions for printing a receipt, an audit trail, or on forms, such as a bill of sale or sales order form. The receipt was usually the original printed copy with the audit trail being the carbon copy, thus requiring dual layer rolls. If the receipt was not desired for any reason, it was simply thrown away since it was the printed-through copy for the purposes of printing on the audit trail. This was true even if a form was being used and a receipt was not required. Heretofore, no provision was made for printing a receipt separately and an audit trail, so that a receipt need not be printed if not desired and yet if desired could be printed concurrently with the audit trail, or if a form was required, the form and the audit trail were printed concurrently without printing a receipt (other than the form).

SUMMARY OF THE INVENTION

This invention comprises a data terminal having a dual printer of the matrix type for printing on one, or two stations concurrently, of the three stations, if required, so that a customer may be provided with a receipt at the same time the storekeeper is provided with a permanent record. This is accomplished in the present invention by providing a data terminal with means for printing the record media and for transporting the record media across the work level surface in different directions. When in the mode required for a receipt, the media is printed upside down relative to the printing on the audit trail, which will be normal when handed to the customer, or when in the form required for a customer, the form is transported in a different direction from the audit trail in order to provide the capability set forth.

BRIEF DESCRIPTION OF THE DRAWINGS

FIG. 1 is a perspective of a cutaway portion of a data terminal schematized to illustrate the various working parts, including the dual matrix printer and its path of travel relative to the three print stations on the work level surface.

FIG. 2 is a schematic drawing of the means for augmenting the printing of the characters on the record media.

DESCRIPTION OF THE PREFERRED EMBODIMENT

In FIG. 1, the data terminal 10 (with cover removed for purposes of clarity) is shown as comprising, overall, a carriage 12 movable laterally with respect to a frame 14, a work level surface 16 having three print stations 18, 20 and 22, and an appropriate keyboard 24. The three print stations 18, 20 and 22 are, respectively, a receipt station where the customer's receipt is printed (if a receipt is required), an audit station where the storekeeper's record (audit trail) of all transactions are printed, and a form station where the customer's order form or bill of sale is printed, if required.

By this arrangement, the carriage 12 will move, not only from the printing position shown, viz, at the audit station and receipt station, but to the form station and audit station as well as traversing each pairs of stations so that appropriate rows and columns of data entered into the data terminal at the keyboard 24 is appropriately printed out. The carriage 12 is mounted on a pair of bars 26 and 28 to hold the carriage in parallel relationship with the work level surface 16 and the rest of the data terminal and traverse movement on the parallel bars is accomplished by a suitable drive mechanism 30 including a belt 32 attached to carriage 12, and pulley means 34 motivated by a reversible motor (not shown).

In the embodiment shown, a receipt 36, if required, is printed in the receipt station 18 and an audit trail 38 is printed in the audit station 20 when the carriage 12 is in the position shown as the two record media (paper) are moved forward, i.e., in the direction of the keyboard 24, and from a suitable supply, such as a roll of paper, by a suitable roller feed mechanism 40 driven by a motor and clutch means 42 coupled to shaft 44. When the carriage 12 is positioned to the left from that shown, a form 46, such as a customer order form or bill of sale, is printed in station 22 at the same time the audit trail 38 is being printed.

The audit trail 38 is rolled onto a spool 48 partially shown in FIG. 1, while the receipt 36 is severed, when a complete transaction is recorded, by a suitable cutting mechanism, indicated in its entirety as 49. Also, the forms station is provided with a pair of electronic sensing means 50 and 52 which determine when a form 46 is properly located in the forms station, otherwise the terminal is inhibited from operating; suitable electronics being provided for this purpose. Rollers 54 feed the form in a direction opposite from the direction of travel of the audit trail by suitable gearing to couple the rollers to shaft 42 which moves the form and audit trail or audit trail and receipt, or audit trail alone, as the case may be, incrementally, in response to and in combination with printing mechanisms to form rows and columns of data as determined by the input to the keyboard 24.

The carriage 12 is also provided with a pair of matrix printers 56 and 58 capable of printing on two of the three stations at the same time, viz, the receipt station and the audit station, or when the carriage is positioned to the left from that shown on the form station and audit station.

For the proper positioning of the rows and columns of characters on the record media, the combination of a mechanical strobe means 60 and suitable electronics cooperating therewith, are provided but are described and claimed in a copending application, supra, in more detail. No further description thereof is deemed necessary herein, since this invention is directed to the concept of a data terminal with a dual printer capable of printing in one or two of three print stations.

Furthermore, a suitable ink supply means for the dual matrix printers located in the carriage 12 are shown in FIG. 1 only schematically, since the ribbon, in the form of a typewriter ribbon 62 with spools 64, 66, its novel inking supply arrangement, comprising a pair of reservoirs 68 and 70 and means to reverse the ribbon when the ribbon is not in the print field as determined by the position of carriage 12 and strobe bar 60, and other details to improve the operation of the matrix printers and data terminals generally are described and claimed in a copending application. Also, the means for spooling the audit trail have means for providing only uniform linear motion for the roll of paper as it is moved around spool 48 for improving the operation of data terminals, as described and claimed in more detail in a copending application supra.

Thus, neither the details of the ink supply means for the dual printer nor the novel spooling arrangement will be described herein again, since this invention is directed to the concept of a data terminal with a dual printer capable of printing on one or two of three stations.

It should be noted at this time, however, that one of the many advantages of matrix printers in the data terminal is the ability to print legibly through several copies of forms in the form station and, also, the printing on the audit trail and form. This upside down printing on the receipt enables the complete transaction, such as a sale, to be recorded and totaled in the manner in which any transaction is normally read, i.e., top to bottom, for the benefit of the customer. This is also true of the form printed at the form station since the form moves in a direction opposite to the direction of travel of the receipt. This is not true, however, for the printing on the audit trail, which is stored in the machine to be used by the vendor. The means to accomplish the printing as described in this paragraph will now be described in some detail.

Turning now to FIG. 2, there is shown the overall schematic operation of the printing aspect of the data terminal 10 to enable the matrix printers 56 and 58 to print in the three stations 18, 20 and 22. In this figure, the carriage 12 is shown moving to the right or to the left relative to the linear strobe bar 60 shown in FIG. 1 attached to the frame 14 and stationary relative to the print stations 18, 20 and 22 to position the rows and columns of characters for printing on the receipt 36, if required, the audit trail 38 and the form 46 when the latter is in position.

The linear strobe bar 60 has groups of relatively long slots, indicating "home position" in the left in channels A and B, three at the mid-point of the bar 60 in all three channels A, B and C, and two on the right in channels A and C. Suitable sensing means, such as emitters and receivers of the phototransistor type, indicated by box 72, are positioned on the carrier and move therewith to sense the position of the carrier. The sensing means will determine the position of the carrier, two long slots in channels A and B determining the left "home position", the three long slots determining the center "home position", and the two long slots in channels A and C determining the right "home position" of the carrier. These positions are also no-print positions.

Channel A also has two sets of slots of 31 each which are in the "print field" determined by the adjacent edges of the long slots. The left-hand print field 74, the Audit/Form field, is to enable the matrix printers to print on the audit trail and form and the right-hand print field 76, the Audit/Receipt, enables the matrix printers to print on the audit trail and receipt, if the receipt field is required.

The matrix printers 56, 58 are connected to the block entitled "Character Printing Electronics", which is described and claimed more in detail in the copending application, supra, but basically enables the various wires of the matrix printers to print the characters on the record media as positioned by the various individual slots in the print field identified by the sensing means 72 depending upon the mode determined by the entry into the keyboard 24. The character electronics, for schematic purposes only, is connected to the pair of AND-gates 78, 80 to characterize the operation of this invention. If the carriage is in the Audit/Receipt mode and AND-gate 80 is enabled, the output of the Character Printing Electronics is connected to printers 56 and 58, identified by lines 56 and 58, printer 56 printing in the audit station 20 and printer 58 printing in the receipt station 18. It is to be noted, however, that the output from the AND-gate 80 is inverted to printer 58 while printing at 18 because the receipt is printed upside down relative to the audit trail to enable the receipt to be totalized in the normal up-down fashion for customer convenience and as shown in FIG. 1.

A switch 82 is shown interposed between the output of the inverter and the receipt to schematize and illustrate the fact that the receipt is not always required. This switch 82 can be operated manually or by sensing of a properly positioned form in the print station 22.

When the carriage is in the Audit/Form mode, the output of the Character Printing Electronics is inputed into an AND-gate 78 which, in turn, is outputed into the matrix print heads, identified by lines 56 and 58, print head 56 printing on the form 46 and print head 58 printing on the audit trail 38. As mentioned in connection with the description of FIG. 1, the forms station has a form position sensing means 50, 52 which is shown as a block prior to the input of the AND-gate to prevent enabling of both matrix printers in the event that the form 46 is not properly positioned in the form station 22. It is also to be ntoed that the main drive means 42 drives the receipt 36 and form 38 in the same direction, i.e., toward the keyboard 24 as shown in FIG. 1, and indicated by arrows in this figure, but the form in station 22 is driven away from the keyboard, as shown by the arrow in this figure.

What is claimed is:

1. A data terminal having a work level surface with a receipt station, an audit station and a forms station, each located adjacent one another substantially coplanar on the work level surface, and means for transporting three record media across said stations, a carrier containing a pair of matrix printers movable across said work level surface and capable of printing characters on media in one of said stations, or two adjacent stations concurrently, and means for positioning said matrix printers relative to said stations in response to input to the data terminal.

2. The data terminal as claimed in claim 1 wherein said means for transporting said media moves two of said media in one direction and another media in an opposite direction.

3. The data terminal as claimed in claim 1 wherein means are provided for inhibiting operation of said data terminal unless the media is correctly positioned in said forms station.

4. The data terminal as claimed in claim 1 wherein means are provided for inhibiting operation of the printer at the receipt station if a receipt is not desired.

5. A data terminal having a plurality of substantially coplanar printing stations located adjacent of one another, a carrier containing a pair of matrix printers movable across said station capable of printing characters on media in one of said stations, or two, adjacent stations simultaneously, means for transporting record media in each of said stations transverse the translatory motion of said carrier to provide columns of the rows of characters printed by said printers as the latter move translatory of said media, and means for positioning said matrix printers relative to said stations in response to input to the data terminal.

6. The data terminal as claimed in claim 5 wherein the number of print stations is three and said one station is the middle station of the three stations and the one on which the matrix printer always prints when operative.

* * * * *